(12) United States Patent
Prodam et al.

(10) Patent No.: US 9,589,197 B2
(45) Date of Patent: Mar. 7, 2017

(54) METHOD FOR BIOMETRIC RECOGNITION WITH CLUSTERING OF REGISTERED DATA FOR POS/ATM APPLICATIONS

(71) Applicant: UNICREDIT S.p.A., Rome (IT)

(72) Inventors: Riccardo Prodam, Milan (IT); Marco Berini, Massa-Carrara (IT); Marcello Paris, Rome (IT)

(73) Assignee: UNICREDIT S.p.A., Rome (IT)

( * ) Notice: Subject to any disclaimer, the term of this patent is extended or adjusted under 35 U.S.C. 154(b) by 0 days.

(21) Appl. No.: 14/653,211

(22) PCT Filed: Dec. 18, 2013

(86) PCT No.: PCT/IT2013/000352
§ 371 (c)(1),
(2) Date: Jun. 17, 2015

(87) PCT Pub. No.: WO2014/097339
PCT Pub. Date: Jun. 26, 2014

(65) Prior Publication Data
US 2015/0332275 A1    Nov. 19, 2015

(30) Foreign Application Priority Data

Dec. 20, 2012   (WO) ................. PCT/IT2012/000389
Dec. 11, 2013   (WO) ................. PCT/IT2013/000345

(51) Int. Cl.
*G06K 9/00* (2006.01)
*G06Q 20/20* (2012.01)
*G06Q 20/40* (2012.01)

(52) U.S. Cl.
CPC ..... *G06K 9/00979* (2013.01); *G06K 9/00885* (2013.01); *G06Q 20/20* (2013.01);
(Continued)

(58) Field of Classification Search
CPC ........... G06K 9/00979; G06K 9/00885; G06Q 20/20; G06Q 20/40145
(Continued)

(56) References Cited

U.S. PATENT DOCUMENTS

| | | |
|---|---|---|
| 2010/0045788 A1 | 2/2010 | Zhang et al. |
| 2012/0057763 A1 | 3/2012 | Horng et al. |
| 2014/0196118 A1* | 7/2014 | Weiss ................. H04L 63/0846 726/4 |

FOREIGN PATENT DOCUMENTS

| | | |
|---|---|---|
| EP | 1 752 930 A2 | 2/2007 |
| EP | 1 881 461 A2 | 1/2008 |

OTHER PUBLICATIONS

International Search Report for corresponding International Patent Application No. PCT/IT2013/000353 mailed Jun. 3, 2014.
(Continued)

*Primary Examiner* — Ruiping Li
(74) *Attorney, Agent, or Firm* — Merchant & Gould P.C.

(57) ABSTRACT

A method quickly recognizes a person by identification codes derivable from biometric data includes registering a user, and recognizing a registered user, through a respective recognition event. Each registration event includes acquiring at least one biometric datum related to blood vessels of the user. The acquired biometric datum is encoded into a respective registration identification code and associated with the user. The user and the associated registration identification code are registered. Each recognition event includes acquiring biometric datum related to the user's blood vessels and encoding the acquired biometric datum into a respective recognition identification code. Based on the registered registration identification codes, a comparison set of comparison identification codes is prepared and compared. For each comparison, a matching level is estimated and the user
(Continued)

is recognized or refused recognition based on the estimated matching levels.

20 Claims, 4 Drawing Sheets

(52) U.S. Cl.
CPC .................. *G06Q 20/40145* (2013.01); *G06K 2009/00932* (2013.01)

(58) Field of Classification Search
USPC ........................................................ 382/115
See application file for complete search history.

(56) References Cited

OTHER PUBLICATIONS

Mhatre, A. et al., "Efficient search and retrieval in biometric databases", *Proceedings of SPIE*, 5779: 265-273, (2005).
Buhan, I. et al., "Contextual Biometric-Based Authentication for Ubiquitous Services", *Ubiquitous Intelligence and Computing*, 680-693, (2010).
Witte, H. et al., "Context-Aware Mobile Biometric Authentication based on Support Vector Machines", *2013 Fourth International Conference on Emerging Security Technologies*, 29-32, (2013).

* cited by examiner

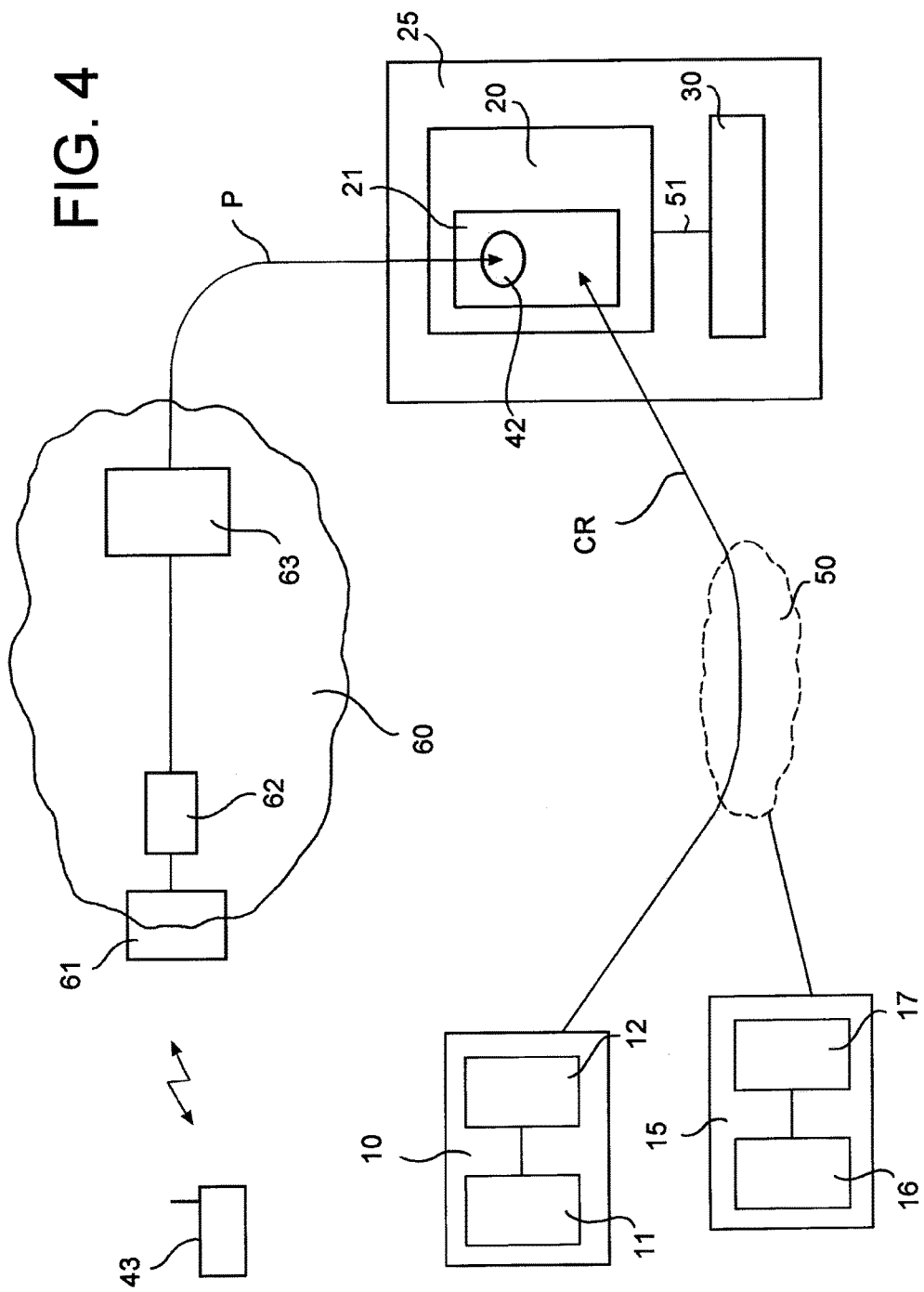

METHOD FOR BIOMETRIC RECOGNITION WITH CLUSTERING OF REGISTERED DATA FOR POS/ATM APPLICATIONS

This application is a National Stage Application of PCT/IT2013/000352, filed 18 Dec. 2013, which is a Continuation-in-Part of PCT/IT2012/000389, filed 20 Dec. 2012 and a Continuation-in-Part of PCT/IT2013/000345, filed 11 Dec. 2013 and which applications are incorporated herein by reference. To the extent appropriate, a claim of priority is made to each of the above disclosed applications.

TECHNOLOGICAL BACKGROUND OF THE INVENTION

Application Field

The present invention relates to the field of the methods, based on acquisition and electronic processing of biometric data, for the recognition of users of services the fruition of which requires a registration and an authorization. Particularly, the invention relates to a method of registration and recognition of users of POS (Point Of Sale) and ATM/cash dispenser services, as well as a method for delivering such services.

The invention also relates to a recognition system which carries out the above method, and POS and ATM systems comprising such a recognition system.

Description of the Prior Art

In the context of the offering of services the fruition of which requires a recognition and an authorization, the need and the convenience to use recognition and/or identity verification and/or authorization methods based on acquisition and electronic processing of biometric data are increasingly perceived.

In particular, such a need is felt in the field of services related to commercial payments, for example, services of the POS (Point Of Sale) type, or services usually provided by banks for the automatic withdrawal of money from bank accounts, for example, services of the cash dispenser/ATM (Automated Teller Machine) type.

In the known POS and/or ATM systems, a holder of a card (credit card or cash card) accesses a service through two steps, the first of which involves the use of the card itself, the second of which is a confirmation of the identity of the card holder, by typing a numeric/alphanumeric identification code, for example, a PIN or password. The identity confirmation (subject to a prior process of identity verification or "authentication") provides that the recognition system first recognizes the user, through conventional card-based methods, then retrieves the pre-registered identification code (PIN or password) of the recognized user, then compares the registered identification code and the one typed in by the user.

In this framework, it is possible to envisage replacing the identification code with a biometric datum of the user.

In this regard, several solutions for a verification of the identity of a user based on the acquisition and processing of biometric data are known, derivable particularly from the field of the identity verification for security purposes (for example, to permit or not entrance to restricted access areas, or to confidential data in an information system).

The known solutions referred to are varied, both with respect to the biometric datum that is used (for example, fingerprint, or eye iris, or electrocardiographic or breath frequencies/patterns, or voice, or typing frequency/pressure on a keyboard), and with respect to the algorithms used for performing comparison and recognition (usually, analytical "pattern matching" algorithms).

A first problem which arises, if one wished to apply such known solutions to the identity verification in the context of POS/ATM, is to have sufficiently quick, convenient, and simple acquisition procedures so as they are "attractive" for the user. This requirement, by itself, already excludes most of the aforementioned known solutions.

A second problem, even more hindering with respect to the needs felt in the context of POS/ATM services, relates to the fact that the above-mentioned solutions relate to the function of identity verification or authentication, in the meaning explained above, but do not satisfy the need for a "recognition" of the user. In fact, for a "recognition service", the user has to be identified without he/she has to previously introduce his/her presentation, for example by inserting a credit or cash card. The need to have a recognition service is felt as crucial, for POS/ATM services, having the basic objective to even avoid the need to use a card.

Now, an identity verification service involves a mere "one-to-one" comparison between the acquired biometric data of the user and previously registered biometric data of the same user.

On the contrary, a recognition service involves a "one-to-many" comparison between acquired biometric data of the user and a plurality of previously registered biometric data, belonging to all the registered users registered for a given service. Such a plurality may be very numerous: in the context of POS/ATM services, the number of registered users (for example, client of a bank) is typically of hundreds of thousands or millions individuals.

Such quantitative data indicate how significant is the difference between the requirements to be met by a biometric method for an identity verification compared to the requirements to be met by a biometric method for a recognition, and allow to understand the reason why the solutions developed for the former field are completely unfeasible in the latter one.

The main problem that arises relates to the times for the recognition, which requires a large number of comparisons, rather than only one, before obtaining a result, which makes unfeasible the idea of simply iterating many times in sequence the application of the biometric methods of identity verification (such as those mentioned above) as a recognition method.

In view of this problem, no feasible solutions are found, not even resorting to solutions that are known in other fields, for example, those based on the acquisition of fingerprints of a person to be recognized and on the scanning a database of fingerprints to find a match. Such solutions, which are used, for example, for legal investigations, entail in the known implementations, in the absence of drastic improvements, recognition times (i.e., duration of the recognition process) which are longer, by several orders of magnitude, with respect to the recognition times required in the POS/ATM field, which are acceptable if they last at most a few seconds.

Furthermore, the solutions mentioned above do not always ensure a degree of recognition reliability that is sufficient for POS/ATM applications.

In fact, it shall be noticed that the POS/ATM services, being related to payments or money transfers, require a very high recognition reliability degree, comparable to that provided by the current card-based solutions with a confirmation by means of a PIN/password. This is a stringent requirement for the providers of such services, for example, banks.

The objective of eliminating PIN/password and also the card, while maintaining a degree of recognition reliability sufficient for such applications, and relying on biometric data, is a still unsolved technical challenge.

With regard to the requirement of reliability, it is important to notice that the recognition at a POS/ATM terminal, as stated above, is currently carried out by means of a password/PIN, which are identification codes that may be defined as "exact", since they can be regenerated in an identical manner, deterministically, upon each recognition event.

On the contrary, biometric data are identification codes that may be defined as "non-exact" (or "not exact"), wherein an absolute, deterministic identity between the registered datum and the datum acquired during recognition phase cannot be achieved. The fact of obtaining from non-exact identification codes reliability recognition results comparable to those that may be obtained from exact identification codes is a technical object that cannot be achieved by the prior art.

The requirements of reliability and speed, imposed by a recognition method in the POS/ATM field, are not even solved by solutions recently proposed to make the acquisition of the biometric data easy and quick, such as the solutions based on the acquisition of images of the user's hand palm.

For example, the patent application US 2012/0057763 illustrates a system of such a type, employing deterministic algorithms (SITF, convolution processes) to extract a plurality of biometric characteristics from the acquired image. The application is the one of an identity verification, in which the single "one-to-one" comparison required is carried out through a plurality of single comparisons.

The patent application US 2010/0045788 illustrates a further system of such a type, using analytical algorithms (for example, Kong algorithm, based on Gabor filters) in order to express an approximate assessment, of "pattern similarity", for example, by means of a function "distance". Such a system also performs comparisons on a plurality of biometric characteristics.

Generally, the systems of the above-mentioned type employ analytical algorithms (for example representing by means of equations the hand surface and detecting characteristic points on the hand surface) which approximate as a number, such as a "distance", a "degree of similarity" in an identity comparison check. Therefore, in order to obtain an acceptable reliability degree for an identity verification, they are "forced" to perform several comparisons, on a plurality of biometric characteristics, for each single "matching" comparison.

This involves an increase in the amount of data to be stored, for each acquired image, and an increase in the number of elementary comparisons that are necessary for each single identity verification.

For these reasons, even if it is possible to try to apply such systems in the context of a "one-to-many" recognition service (in the meaning illustrated above), such solutions cannot be applied (actually, their application is not even conceivable) in the context of services requiring the recognition of a user among thousands, or hundreds of thousands, or even millions users, such as those contemplated herein.

In order to obviate the above-mentioned problems, possible improvements relating to the rapidity of the single comparison are useful, but not decisive. In fact, it has already been noticed that the recognition methods, due to their own nature, must have a very high degree of reliability as regards the recognition precision. Such a goal requires that each comparison between the acquired datum and each of the registered data ("non-exact" codes) is performed very accurately, by means of advanced algorithms, which implies that the reduction in the processing times for a single comparison cannot be compressed beyond certain limits.

In brief, it can be stated that a biometric recognition method such as to meet the needs of an application in the field of POS/ATM must have several characteristics: simplicity and rapidity of acquisition of the biometric datum; processing speeds such as to allow a very fast recognition; high precision and recognition reliability.

No one of the solutions of the prior art, mentioned above, is capable of meeting at the same time all the aforementioned needs, and not even of providing a performance trade-off which is close to what is required.

Therefore, the object of the present invention is to devise and provide a method for a registration and quick recognition of a user, which is improved so as to meet the above-mentioned needs, and capable of obviating the drawbacks described herein above with reference to the prior art. It is also an object of the present invention to devise and provide a method of delivering a service, employing the above-mentioned recognition method, which proves to be particularly efficient. The achievement of the object indicated above further allows achieving the further objects of devising and providing a system for a quick recognition of a user, and POS and ATM systems, which systems are, in turn, improved so as to meet the above-mentioned needs, overcoming the above-mentioned drawbacks related to the prior art.

SUMMARY OF THE INVENTION

The method of registration and recognition according to the invention is preferably directed to an application field relating to the POS/ATM services (already defined above), in relation to which it particularly deploys its advantages. By user recognition (and therefore by "recognition service" and "recognition method") is meant the ability of identifying the user without he/she has to previously introduce his/her presentation.

However, such method can be also applied to the context of other services providing for a recognition of one user among many registered users.

Furthermore, the method can be also employed for identity verification and/or authentication functions, providing for "one-to-one" comparisons of biometric data. In fact, when reference is made to an "identification code" and to a "recognition service", this also encompasses the sub-case of a confirmation of the user's identity, and, likewise, of a confirmation service of the user's identity, that can be also exploited, for example, for authorization purposes.

According to an embodiment of the method, it comprises not only the recognition of a user, but also the identification of the user, i.e., an association of the recognized user with a record of user identification data necessary to deliver the service (comprising, for example, the bank account number). Such embodiment gives a basis for the method of delivering a service, also encompassed in the invention.

BRIEF DESCRIPTION OF THE DRAWINGS

Further characteristics and advantages of the method of registration and recognition, of the method of delivering a service, of the system for the recognition of a user of a service, and of systems for providing ATM/POS services, according to the invention, will be apparent from the description set forth below of preferred implementation examples, given by way of illustrative, non-limiting example, with reference to the annexed drawings, in which:

FIGS. 3 and 4 illustrate a simplified functional scheme of a further embodiment of the system of the invention.

DETAILED DESCRIPTION

Figure 1:
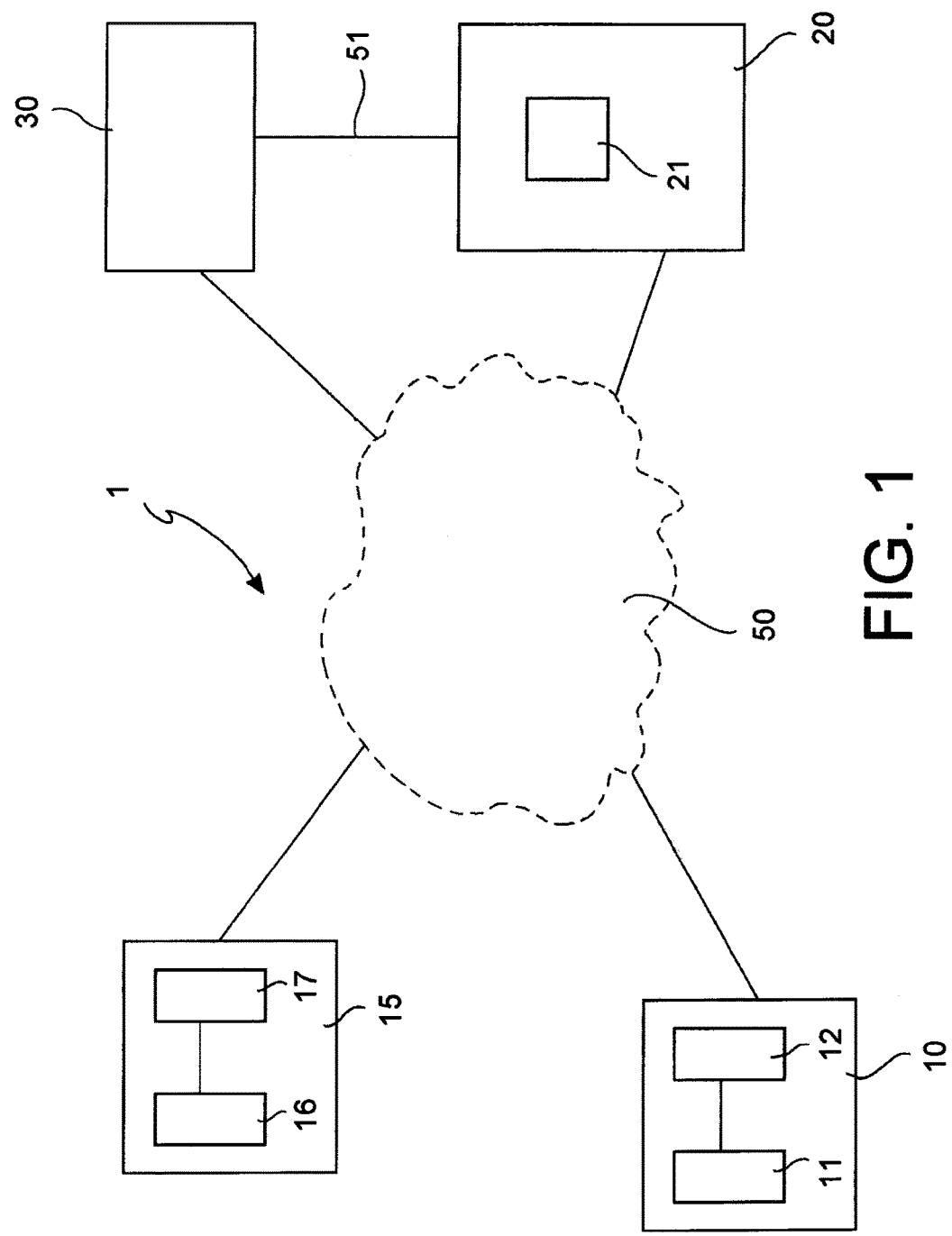
FIG. 1 illustrates a simplified functional diagram of a system for the recognition of a user according to the present invention.

A method for registration and quick recognition of a user of a service, by means of identification codes derivable from biometric data, will now be described in more detail.

First of all, such method provides for the step of registering a user, through a respective registration event.

Each registration event comprises the steps of acquiring from the user to be registered at least one biometric datum related to a configuration of blood vessels of the user; then encoding, by means of a coding procedure, the at least one acquired biometric datum into a respective registration identification code of the user to be registered; then, associating such registration identification code to the user to be registered; finally, registering the user as a registered user, and registering the associated registration identification code as the registration identification code of the registered user.

Then the method comprises the step of recognizing a registered user, among a plurality of registered users, through a respective recognition event. Each recognition event comprises the step of acquiring from the user to be recognized the same at least one biometric datum of the user, acquired in the registration step, related to a configuration of blood vessels of the user; then, the step of encoding, by the coding procedure (the same coding procedure employed in the registration event), the at least one biometric datum acquired into a respective recognition identification code of the user to be recognized.

Each recognition event further provides for preparing, based on the registration identification codes, registered at a plurality of registration events, a comparison set comprising a plurality of comparison identification codes; then, comparing the recognition identification code with each of the plurality of comparison identification codes; then, estimating, for each of such comparisons, a respective matching level; finally, recognizing or non-recognizing (i.e., refusing recognition) the user to be recognized, based on the estimated matching levels.

The above-mentioned step of preparing a comparison set comprises defining the comparison set starting from the overall set of all the registration identification codes of the plurality of already registered users, and using, on such overall set, classification and grouping techniques on the registration identification codes.

The term "service" refers in general to a service the use of which requires registration. As already observed, the preferred field of application of the aforementioned method is the recognition of one user among many, aimed to deliver a POS/ATM service.

Typically—for a given service—the user registration events are many, one for each user, and they occur upon the user registration. Therefore, they give rise to a plurality of registered identification codes, one for each registered user. Such registered identification codes are stored, and form the base on which the search aimed to the recognition is performed, during a recognition event.

When using the invention as a recognition and security solution in POS/ATM terminals, the base of users using such service (for example, customers of a bank) is numerically remarkable, up to a scale order of millions of persons.

Therefore, the plurality of registered users, among which a user is to be recognized, corresponds to the plurality of users registering to access a service of the POS/ATM type, and may potentially include even millions of persons. Also the number of registered identification codes may be of the same order of magnitude, and, therefore, such is the size of the set of registered identification codes to scan to get the recognition; consequently, the number of comparisons, needed for each recognition event between the recognition identification code (i.e., the one acquired for the recognition) and registered registration identification codes, may be very large.

The term "recognition event" is intended to indicate the event which takes place when the user, who has already registered for the use of the service, wishes to perform a POS/ATM operation, for which he/she has to be recognized/identified in advance.

In view of what has been stated above, the method must have properties of particular rapidity and precision, to be able to meet the requirements imposed by the applications mentioned above.

Such properties are made possible by the characteristics of the method, illustrated above, in particular by the optimized surfing (i.e., navigation) within the database containing the bulk of registered data (particularly, registered identification codes), which is made possible by the above-mentioned classification and grouping techniques, as it will be described in more detail herein below.

A particular consideration may be derived from the fact that the registered identification codes do not coincide with the acquired biometric data, but they biunivocally depend thereon through the coding procedure. It is important to notice that the method of the invention is completely compatible with the fact that each data handling procedure, in the context of a registration and recognition, follows per se known criteria, and it strictly complies with the requirements imposed by laws in force and by the opinions of the in-charge authorities on the matter of security and safeguarding of privacy.

In accordance with a particular implementation example of the method, the step of defining a comparison set comprises the steps of classifying each registered registration identification code, based on one or more classification variables; and grouping the registered registration identification codes into sets of comparison identification codes, based on the performed classification.

In the case that the registered identification codes are stored in a database, the database is scanned with a scanning order based on the grouping, and the comparison operates according to such scanning order.

For example, the comparisons are performed only or with priority on the set of identification codes arranged according to the above-mentioned criteria.

For the grouping, "clustering" techniques may be used, both supervised and non-supervised, taking into account different possible forms of groupings, or "clusters" (such as "overlapping" clusters, "fuzzy", aleatory clusters, and so on) and different classification possibilities (for example, supervised clustering in disjointed clusters), in order to fasten the overall recognition procedure as much as possible.

Different "clustering" algorithms may be used in different implementation examples of the invention, including, for example (however not limited to) "canopy", "k-means", "fuzzy", "expectation maximization", "Mean Shift", "hierarchical", "Dirichlet process", "Spectral", "top-down" algorithms.

By way of illustrative, non-limiting example, it may be noticed that the above-mentioned classification variables may belong to a set comprising: geometrical variables deriving from transformations of non-exact identification codes into identification codes according to a mathematical grammatical scheme; and/or co-dependences between identification codes and physical localizations of terminals arranged for the recognition, for example, correlations between the location of a recognition event and the location of a registration event; and/or co-dependences between localization of the registered users and a known localization of the recognition terminals.

According to a particular implementation example, the grouping step further comprises the step of indexing the registered identification registration codes based on such one or more classification variables.

It has already been noticed that the recognition functions provided by the present method go well beyond the functions of a mere identity verification, and pose much more challenging requirements. In fact, such functions provide not a comparison between a single acquired identification code and a single registered identification code, but a comparison of the acquired identification code to each of a plurality of registered identification codes (for example, stored in a database).

Therefore, a very important aspect to make the method performances suitable to the context of use, is to speed not only the single comparison, as illustrated above, but also the plurality of comparisons to be performed, the number of which may be of the order of magnitude of the size of the database of registered clients, i.e., up to hundreds of thousand or even millions of users.

According to an embodiment of the invention, the method provides for optimized database surfing modes (particularly, in terms of rapidity of search), based on a "smart" parsing of the database, instead of being based on a merely sequential scanning of the entire database. This implies that priority criteria are defined, indicating which parts of the database have to be scanned first, since the corresponding registered identification code possibly leading to recognition is expected to be found most probably therein.

This aspect, in turn, involves a "clusterization" of the database, i.e., a suitable grouping of the standard identification codes registered in the database. By virtue of such clusterization, therefore, the database surfing may be optimized and made quicker, which is performed by an "intelligent" scanning of the database with a scanning order based on the "clusterization", starting from the sets of registered identification codes the variables of which have the most relevance with those of the current recognition event.

It shall be noticed that such database surfing may be carried out (once the database has been organized as indicated above) by per se known database search engines.

Some embodiments of the method will be now considered, in which the recognition terminals have a known localization, and the classification variable is based on the correlation between localization information of the user and the known localization of the recognition terminal. In such a case, the method provides for preparing and associating to each of the at least one recognition terminal a respective comparison set, comprising a plurality of comparison identification codes, each corresponding to a registration identification code of a respective user registered in a previous registration event. The plurality of comparison identification codes is then selected, among the registered identification codes, for each of the at least one recognition terminal, based on a comparison between localization information of the registered users and the known localization of the recognition terminal.

An embodiment (corresponding to the system illustrated in FIG. 3) provides that the localization of the user is determined based on geolocation (i.e., geolocalization) information provided, for example, by user terminals.

Another embodiment (corresponding to the system illustrated in FIG. 4) provides that the localization of the user is determined based on positioning information provided by a telecommunications network to which the user can connect.

Figure 3:
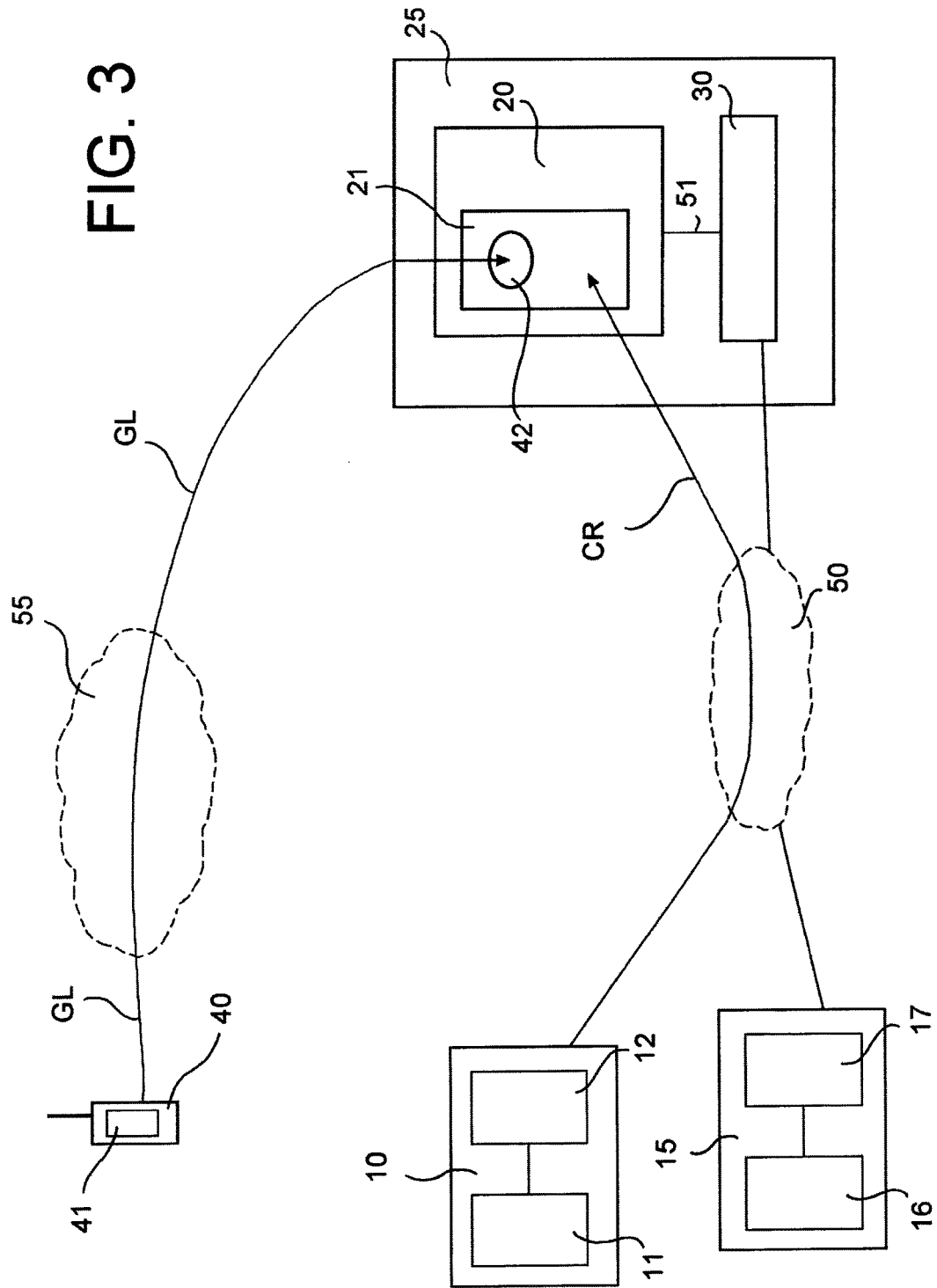

In the embodiment of FIG. 3, each of the recognition terminals 10 is connected to a management center 25, in which the localization of each thereof is stored. Therefore, the management center knows the localization of the recognition terminals 10, at service delivery centers. Alternatively, the recognition terminals 10 may be configured to send localization information to the management center 25, based on a geolocalization device associated thereto.

Furthermore, the step of registering a user comprises in such a case providing geolocation means 41, suitable to be associated to the registered user, and configured to provide geolocation information GL of the registered user. Such information can be sent "in real time" (with respect to the times of the processes considered herein); therefore, they can be dynamically updated.

Therefore, the step of selecting the plurality of identification codes of the comparison set, associated to each of the recognition terminals, comprises the steps of receiving and processing, by the management center 25, the geolocation information GL of geolocalizable registered users, to determine the localization of each geolocalizable registered user; then, comparing, by the management center 25, each of the localizations of the geolocalizable registered users and the known localization of the particular recognition terminal 10 for which the comparison set is being defined; finally, selecting the plurality of comparison identification codes, among all the registered identification codes, based on the above-mentioned comparison.

It should be noticed that by a "geolocalizable user" is meant a user provided with geolocation means 41, and who keeps such geolocation means 41 active, so that the corresponding geolocation signals GL can reach the management center 25. On the contrary, a non-geolocalizable user is a user, among the registered ones, who decides, according to his/her choice, which is of course to be guaranteed, not to send geolocation signals, for example, by turning his/her mobile terminal 40 off.

With reference to the comparison sets, it should be further noticed that each recognition terminal 10 is associated to a respective comparison set, and that each of these comparison sets may be dynamically updated, by the management center 25, based on the geolocation information GL of the users, evolving in real time.

In an implementation example, the above-mentioned step of providing geolocation means 41, suitable to be associated to the registered user, comprises providing a "client" application program 41 loadable on a mobile user terminal 40 provided with geolocation functions; such "client" application program 41 is configured to acquire geolocation information GL and to send it to the management center 25. Furthermore, the method provides in this case for arranging a "server" application program 42, in the management center 25, configured to receive geolocation information GL from the mobile user terminal 40, to recognize the respective user of the mobile terminal, to check whether the user is a registered user, and, if so, to associate the received geolocation information GL to the registration identification code of the user.

In such a case, the registered user selects whether to be a geolocalizable registered user or not by acting on the mobile terminal 40 (for example, by turning it on or off) or by acting on an enabling/disabling control provided by the "client" application program 41.

In the embodiment of FIG. 4, each of the at least one recognition terminal 10 is connected to a management center 25, in which the localization of each of them is stored. Also in this case, the management center 25 knows the localization of the recognition terminals 10, at service providing centers. Alternatively, the recognition terminals 10 may be configured to send localization information to the management center 25, based on a geolocalization device associated thereto.

Furthermore, the step of registering a user, in such a case, comprises providing connection means 43, associable to the registered user, configured to allow a connection of the registered user to a telecommunications network 60 comprising a network control center 63, capable of detecting positioning information P of connected registered users, and operatively connected to the management center 25.

Therefore, the step of selecting the plurality of identification codes comprises the steps of detecting, by the network control center 63, for each connected registered user, a respective positioning information P; the network control center 63 then communicates to the management center 25 such a positioning information P for each registered user. The management center 25 processes the received positioning information P, to determine in real time the localization of each connected registered user; then, it compares the localizations of the connected registered users and the known localization of the recognition terminal 10; finally, it selects the plurality of comparison identification codes, among all the registered identification codes, based on the results of such comparison.

In an implementation example, the telecommunications network 60 is a wireless access network provided with a plurality of access points 61. In such a case, the above-mentioned step of detecting a positioning information P comprises identifying the access point 61 to which a user is connected, and determining the positioning information P of the user based on the access point 61 to which the user is connected.

According to an implementation example, the access point 61 is a wireless access point (or "access point") 61 or an access router 62.

The telecommunications network 60 may be a mobile network (for example, 3G/UMTS) or, preferably, a wireless network of the WiFi type, or, according to another example, of the Bluetooth or LBTE type (Bluetooth with very low energy consumption).

Considering for example the WiFi network, it has the information, at some network levels, about the access point to which a given user is connected (i.e., "engaged"), and therefore an information about the user position. Then, the WiFi network communicates to the management center of the recognition method such positioning information, and then allows such management center triggering the recognition procedure, which can therefore use the received positioning information to determine the user localization.

Herein below, reference will be made to another aspect of the recognition method, i.e., to the manner in which the "localization" of the user is expressed and processed.

Two preferred implementation options will be illustrated (without excluding other options, also potentially encompassed in the invention): a localization in terms of geographic coordinates, and a localization in terms of presence of the user within a given "access area". Both options can be comprised in each of the two embodiments of the method illustrated above, even if the use of the geographic coordinates is contemplated preferably in the first embodiment, and, on the other hand, the use of the "access area" is contemplated preferably in the second embodiment.

Therefore, according to an implementation option, the localization of each recognition terminal 10, known to the management center 25, is defined in terms of geographic coordinates of the recognition terminal 10. In this case, the step of comparing the localizations of the users and the localization of the recognition terminal comprises the steps of determining the position of each geolocalizable user, by the management center 25, based on the respective geolocation information received, in terms of geographic coordinates of the geolocalizable user; then, calculating a distance between each geolocalizable user and each of the recognition terminals 10, based on the geographic coordinates of the geolocalizable user and the geographic coordinates of the recognition terminal.

It should be noticed that by "geographic coordinates" are meant for example the latitude and longitude coordinates, which can be determined, for example, by the coordinates provided by a satellite-based geolocation system, per se known, such as GPS or Galileo.

It should be further noticed that, in the above-mentioned implementation example, the method provides for calculating a kind of matrix of the distances "user"-"recognition terminal", so as to potentially have, in each moment, the distance among any users and any of the recognition terminals of the network controlled by the management center.

Based on the knowledge of the "user—recognition terminal" distances, the step of selecting the comparison identification codes, associated to a recognition terminal, comprises for example selecting the registration identification codes of the geolocalizable registered users for which the distance from the recognition terminal is less than a presettable threshold distance.

In other terms, the comparison set of a given recognition terminal, in a given moment, comprises all the registered identification codes of those users who, in view of the geolocation information available in real time, are present within a given radius from the recognition terminal.

This implies that, if the user near to the recognition terminal actually reaches the recognition terminal and performs a recognition event, the recognition identification code acquired by the recognition terminal is immediately compared only with the registered identification codes of the set of registered users who are present in the proximity of that recognition terminal. Such set, on one hand, certainly contains the registered identification code of the user at issue; on the other hand, it includes a sub-set, which is most likely very small compared to the set of all the registered users. Therefore, the number of comparisons that are necessary to get to the recognition is drastically reduced, compared to a method that does not provide for the geolocation of the users; hence, a drastically reduced recognition time and an improved recognition reliability.

From what has been stated above, the advantages to use localization information, by relating it to information on the localization of the recognition terminals, in the field of a recognition method based on biometric data, are apparent.

Such advantages may be easily found also in a number of other possible correlation strategies between user localization information and information on the localization of the recognition terminals, which are also encompassed by the invention.

For example, in a particular alternative implementation example, providing for the presence of a plurality of recognition devices, the step of selecting the comparison identification codes, associated to a particular recognition terminal 10, comprises the step of assigning the registration identification code of each of the geolocalizable registered users to the comparison set of the recognition terminal 10 which is located at the shortest distance from the geolocalizable registered user.

In other terms, each geolocalizable user has its own registered identification code included in the comparison set of the recognition terminal nearest to him/her, towards which he/she will most likely go. In such a manner, a kind of "competence area" of each recognition terminal is generated.

It is apparent that, in alternative examples also encompassed in the invention, it is possible that the identification code of a registered user is included in several comparison sets, corresponding to the two or three or more nearest recognition terminals (for example, in a city, where the density of the recognition terminals is higher). This corresponds to the fact that the different comparison sets may have non-null intersections, and that the "competence areas" of the different recognition terminals may overlap in multiple areas, according to the most varied management criteria applied by the service provider.

In accordance with the other above-mentioned preferred implementation option, the localization is defined in terms of "access area", in which the user is present, associated to an access point 61 to a telecommunication network 60 to which the user is connected. In such a case, the step of comparing the localizations of the users and the localization of the recognition terminal comprises the steps of determining the localization of a user, in terms of presence of the user within said "access area".

The management center 25 operates a kind of "mapping" and subdivision of the territory into "access areas", or "competence areas" pertaining to different respective access points to the network 60 (for example, a WiFi network), to which a registered user can access, and therefore defines the localization of the user in terms of such mapping.

If the method is implemented by means of a plurality of recognition devices 10, in this case also the step of selecting the comparison identification codes, associated to a given recognition terminal 10, may comprise the assignment of the registration identification code of each of the registered users to the comparison set of the recognition terminal 10 which is located at the shortest distance from the access area in which the user presence is detected.

In those applications in which at least one of the recognition terminals 10 is associated to a respective access point 61, the step of selecting the comparison identification codes, associated to a recognition terminal 10, may comprise the assignment of the registration identification code of each of the registered users to the comparison set of the recognition terminal 10 associated to the access point 61 to which the user is connected.

Referring now to the order with which the comparisons of the recognition identification code with the comparison identification codes are performed, both the embodiments of the method may provide that such order depends on the registered user localization information corresponding to each of the selected plurality of comparison identification codes.

According to an implementation example, the comparison is performed by following the iterative rule of performing firstly the comparison between the recognition identification code and the comparison identification code, not yet compared, corresponding to the geolocalizable registered or connected user who is nearest to the recognition terminal. In other terms, not only a "comparison set" of the recognition terminal (sub-set of the set of all the registered users) is defined, but, within this sub-set, the comparisons are performed with the codes of those users who are nearest to the recognition terminal. This may even lead to select immediately the "correct" comparison code (the one of a user very near to the recognition terminal, to which he/she is going), in the case that no other registered users are present in the immediate proximity, which in turn may even lead to a first-attempt recognition.

In another alternative embodiment of the method, the localization information of the recognition terminal is sent to the management center, which selects as prioritary the identification codes of the users that were registered in a surrounding area (for example, in the same city).

In another embodiment of the method, the localization information is not considered, but a "static" classification is provided, based on geometric or mathematic properties of the registered codes, or on other variables characteristic of the stylization of such non-exact codes.

Methods combining the above-mentioned static (for example, based on categorization of geometries) and dynamic (for example, based on a dynamic localization of the users) clusterization strategies are also encompassed in the invention.

Referring now to biometric data, in accordance with an embodiment, the at least one biometric datum related to a configuration of blood vessels, which is acquired, is an image of the hand of the user to be registered or recognized. More specifically, such image may be an image of the hand palm.

According to a particular implementation example, each of the steps of acquiring an image of the hand of the user to be registered or recognized comprises acquiring the image of the hand by means of an infra-red sensor, configured to detect the presence of oxygen in zones corresponding to the passage of blood vessels in the hand, so as to obtain a corresponding representation of a geometry of the blood vessels of the hand.

Such detection allows to detect, from the resulting degree of opacity, the presence of oxygen in the blood. This implies that the acquired digital image shows an image of the veins of the hand palm (in a darker color with respect to the background), in turn representing a geometry of the venous configuration.

It shall be noticed that the presence of oxygen in the blood is a certain indicator of life of the user, which is advantageous for a recognition method aimed to deliver a service, in order to avoid abuses. It shall be further noticed that the geometry of the hand blood vessels (hence, of the venous pattern of the palm) is an individual characterizing aspect, usually constant over time, and it is therefore suitable to be a characterizing biometric datum, such as to allow a recognition and identification.

Since the above considerations generally apply to blood vessels, not only for the hand veins, in further implementation examples, also encompassed in the invention, the biometric data may be referred to other body parts. However, the acquisition of the hand image is preferred, for reasons of practicality, simplicity, and for the significantly distinctive character of the venous pattern of the hand. Therefore, such type of biometric datum may be selected since it allows an easy and quick image acquisition, applicable without causing problems or delays to a user of a POS or a cash dispenser, and because, on the other hand, it permits a substantially certain individual recognition.

Furthermore, in order to obtain an image that is significant to the aims of the invention, such as to show the vein configuration in sufficient detail to highlight individual peculiarities, even a a coarse grain resolution is sufficient (typically, a few kbytes, for instance, 4 kB), which is advantageous to minimize the storing requirements and it is consistent with applications providing for a large number of users.

The digital image of the hand can be obtained, for example, as an output of an acquisition device, in the form of a multi-dimensional vector, i.e., a matrix, of bytes, each of which being indexed to indicate a spatial pixel, and containing a value relative to the shade of gray of the pixel (for example, 0-255).

In accordance with an embodiment, the identification code is a "non-exact" (or "not exact") identification code, and each of the steps of encoding the acquired biometric datum, at a registration or recognition event, comprises a processing of the acquired biometric datum (whichever it is) so as to obtain, as a respective identification code, a respective representation according to a given mathematical grammatical scheme.

The notion of non-exact code (such as a biometric datum) compared to an exact code (such as a password) has been already illustrated above. Particularly, a non-exact code is an identification code allowing a recognition procedure to work even in the absence of a perfect identity among the biometric data of the same user which are acquired in the registration and recognition steps.

The method of the invention is capable of carrying out a recognition based on a non-exact code, such as the one deriving from a biometric datum. The reasons why the acquired biometric data may be different, from one acquisition event to another one, are many, including different positioning of the hand, different lighting conditions, a different approximation obtained from the simplified acquisition output, and so on.

Going through the details of the steps of acquisition and encoding of the image of the hand, one may observe the following aspects. At each image acquisition, both related to the registration, and related to each recognition event, the acquired image is "filtered", i.e., processed, so as to capture a minimum scheme (pattern) of traits that are essential for the recognition: this aspect is part of the coding procedure.

One of the aims of such operation is to spare storage resources and to reduce the verification duration time, which is a further important characteristic to enable the large scale application of the method on a, i.e., for a service with a large number of users.

Another object is to improve the reliability in terms of minimization of the false rejection ratio (FRR) and the false acceptance ratio (FAR).

According to an implementation example (relating to the case where the hand image is acquired, and the biometric datum is the venous configuration of the hand), a first aspect of the filtering operation comprises a processing of the image, according to conventional image processing methods, per se known, for example, to increase the contrast between shades of gray, and facilitate the recognition of the venous pattern.

A second aspect of the filtering operation, peculiar to the invention and founded also on the basis of detailed medical considerations, consists of excluding from the image peripheral or low blood pressure zones, which contribute little or nothing to the recognition, focusing rather on zones with a high presence of oxygen, recognizable by the different shade of grey, which correspond to the main blood vessels of the hand, and in particular to the intersections or crossings between such blood vessels.

A third aspect of the filtering is to rectify the main blood vessels identified, thus determining a stylized image of few straight segments and a few crossings, obtaining a kind of ideogram, which describes the individual aspect of the venous pattern.

Such stylized image can be stored as a registration or recognition identification code, and it advantageously requires a limited storage space and allows a simplified comparison.

In other terms, the "cloud" of data, stored as indicative of the acquired image, represents the stylization of such image, as illustrated above.

Of course, the same type of processing is performed both on the acquired image at the registration step and on the acquired image at the authentication step, to ensure a meaningful comparison.

It should be observed that all the processing operations of the image, mentioned above, consist of processing operations performed on the matrix representing the acquired image: actually, a transformation of the matrix is performed, to obtain a vector of numbers representing the registration or recognition identification code.

Among the algorithms that can be used for the abovementioned image processing, the Scale-Invariant Feature Transform (SIFT) algorithm, per se known, may be mentioned.

According to a further implementation example, the encoding procedure provides for processing the acquired biometric datum so as to obtain therefrom a respective representation according to a given mathematical grammatical scheme. This means that the numbers stored to represent the acquired image are not only organized in mathematical structures, but they are also organized in logical structures, which we define as "grammatical" by sake of analogy with grammatical syntax.

An example of a mathematical grammatical scheme (or pattern), deriving from the processing of the acquired images of the hand, is as follows:

```
:patterns [
{
:type "line segment"
:position
}
{
:type "Y pattern"
:position
}
]
```

In this case, the grammar expresses a well-formed construct in terms of standard basic patterns, i.e., it defines a configuration of basic patterns, for example a configuration of straight lines, corresponding to the abovementioned stylized image.

Referring now to the single comparison between codes, it shall be noticed that, according to an embodiment of the method, each of the comparisons between the recognition identification code and one of the comparison identification codes comprises a processing carried out by applying at least one trained algorithm (that can be equivalently defined as "learning algorithm").

In accordance with an implementation example, the at least one trained algorithm, the at least one trained algorithm, used for each comparison, comprises a trained meta-algorithm M-A, configured to estimate the matching level of each comparison and to determine or not the recognition of the user to be recognized, based on results obtained from two or more different matching level calculation algorithms (in the example of two calculation algorithms, they will be referred to as A1 and A2). Therefore, in an implementation example, the overall algorithm employed in the processing of the method according to the invention comprises a trained meta-algorithm and two or more matching level calculation algorithms.

According to a particular implementation example, such overall algorithm algorithm (considered as a whole) is a parallel and distributed algorithm: "parallel" in that the execution of the overall algorithm provides a logically simultaneous execution of several sequential algorithmic parts; "distributed" in that the processing/calculation system, by which the overall algorithm is executed, is distributed over different calculation units concurrently operating.

In accordance with an implementation option, the trained meta-algorithm M-A is a parametric meta-algorithm, suitable to be represented by means of a parametric formula based on the results of a set of matching level calculation algorithms (A1, A2), wherein each of the parameters of the parametric formula is defined based on a level of reliability of the respective calculation algorithm.

In a further example, the trained meta-algorithm M-A is an analytical meta-algorithm, suitable to be represented as a finite linear combination, with real coefficients, of a set of matching level calculation algorithms, wherein each of the coefficients is defined based on a level of reliability of the respective calculation algorithm.

In this description, the term "meta-algorithm" is taken to mean an algorithm operating on the basis of other algorithms or, in other terms, an algorithm which performs "pooling" from a set of algorithms, components of the "pool".

Not necessarily the meta-algorithm is qualitatively different from the other algorithms in the "pool"; furthermore, the meta-algorithm may have a higher, or lesser, or the same complexity as the algorithms composing the "pool".

The meta-algorithm is distinguished from the other algorithms by its function: in fact, it has as its object to code the decision rule, which is taken after listening to the opinion of all the algorithms comprised in the "pool". Therefore, the meta-algorithm collects and represents the essence of the decisional rule.

The term "parametric algorithm" is adopted in the present description to mean an algorithm the behaviour of which is completely parameterized by a (finite) set of variables, defined "parameters"; typically, the variables at stake are numbers.

The term "analytic (or analytical) algorithm" is adopted in the present description to mean an algorithm for performing a calculation which implements a finitely estimable formula; in particular, the case may be pointed out, in which the formula is simple, as a linear (finite) combination.

In the present description, the term "learning meta-algorithm (or algorithm)" is used to mean that the method of functioning of the meta-algorithm (or algorithm) is updated on the basis of the produced results and of the nature of incoming inputs, at least in an initial learning (or training) phase.

If the algorithm is parametric, the training is is made by a calibration of parameters defining the algorithm behavior.

As regards the matching level calculation algorithms (A1, A2), they may be trained or untrained calculation algorithms, in accordance with different embodiments encompassed in the invention.

For example, the calculation algorithms A1, A2 comprise parametric calculation algorithms.

According to another example, the calculation algorithms A1, A2 comprise analytic calculation algorithms.

In accordance with an implementation option, the processing operation carried out during the comparison step of identification codes, employing a trained meta-algorithm M-A, comprises the steps of calculating a first matching level of two identification codes to be compared, by means of a first matching level calculation algorithm (A1); then, calculating at least one second matching level of such two identification codes to be compared, by means of a second matching level calculation algorithm (A2); finally, combining, by the trained meta-algorithm M-A, the calculated first matching level and the calculated second matching level, each weighted by a respective weight parameter, to estimate the matching level of each comparison. Each of the weight parameters is defined based on a level of reliability of the respective matching level calculation algorithm.

Focus is given now to each single comparison action, between a recognition identification code, acquired upon a specific recognition event, and one of the registered registration identification codes.

Such comparison action firstly provides for an evaluation of the "similarity" (or "matching"), to quantify a "matching probability", i.e., the above-mentioned "matching level"; then, a comparison between the obtained matching level and a preset matching (i.e., recognition) threshold.

In general terms, the similarity/matching evaluation can be performed by means of one or more trained algorithms, each of which being characterized by adjustable parameters, which are set through a learning phase, and which can be progressively refined. The application of such algorithms implies a continuous learning and improvement of the reliability of the results.

In more detail, it has to be taken into account that a very important aspect of the invention is the achievement of a high reliability (hence, probability of success), of the recognition, which involves obtaining the highest reliability as possible of each single comparison process (or "single pattern-matching") between a recognition identification code and a registration identification code, This requires minimizing the false rejection and false acceptance events.

For use in payment systems, the occurrence of "False Acceptance" events is particularly disadvantageous; therefore, the parameter FAR has to be minimized.

Therefore, the method of the invention may be based on a synergy of a plurality of (at least two) algorithms A1, A2, which synergy is made possible by a meta-algorithm M-A, which is trained or pre-trained, in a supervised manner. The result of the calculation algorithms A1, A2 is filtered by the meta-algorithm M-A, which employs meta-heuristic concepts to interpret the results of the single calculation algorithms.

For example, as already noticed, the calculation algorithms A1, A2 may be analytical algorithms, thus quick and relatively simple, since they are based on a deterministic comparison between a result of an analytical calculation and a threshold. Just for this reason, however, each calculation algorithm, considered per se, is often not sufficiently reliable.

The use of the trained meta-algorithm M-A on intermediate results, generated by other calculation algorithms A1, A2, allows improving the reliability of the overall result, while remaining much faster compared to a possible application of trained techniques directly on single images and/or codes to be compared.

In other terms, the method of the present invention involves the synergy of a "local" level (the matching level calculation algorithms or "local algorithms" A1, A2) and a "global" level (the trained "global" algorithm or meta-algorithm M-A, which interprets the results of the "local" algorithms).

In an implementation example, the results of each local algorithm A1, A2 (for example, the first and second matching level estimations), once they have been obtained, can be combined by a predetermined function, characteristic of the global meta-algorithm M-A, to produce the overall matching estimation, and then to determine the recognition or not.

Such predetermined function may be for example a combination depending on weighted parameters. In accordance with a typical implementation example, such function is a sum of weighted results, according to the formula [1] set forth below:

$$R = \sum_{i=1}^{N} \lambda i * Ai$$

in which R is the overall probabilistic matching estimation (R is compared to a threshold T to determine the recognition); $A_i$ is the probabilistic evaluation resulting from the i-th local algorithm; $\lambda_i$ is the weight parameter associated to the i-th local algorithm (representative of the reliability of the results given by such algorithm).

The method, according to an implementation option, further provides, before the use in registration or recognition events, a phase of supervised training of the meta-algorithm M-A, which comprises the steps of: training the meta-algorithm M-A in a supervised manner, based on a series of training comparisons between acquired identification codes and already registered identification codes belonging to users with a known identity; then, determining the reliability level of the matching level calculation algorithms (A1, A2), based on the results of the training comparisons; finally, defining the parameters (i.e., the weight parameters, i.e., the coefficients of the meta-algorithm M-A) based on the determined reliability levels, to obtain a desired overall probability of success of the recognition established by the meta-algorithm M-A.

Therefore, the step of supervised training of the meta-algorithm is in this case an initial training phase of the system of weight parameters or linear combination coefficients, which training is aimed to adjust the outcomes of the meta-algorithm, in order to obtain the best possible level of accuracy and minimization of the FAR (False Acceptance Ratio) parameter of the same meta-algorithm, at the initial time.

Such training phase may consist in a calibration procedure of the parameters.

Referring back to the above formula [1], it may be noticed that the parameters $\lambda_i$ are determined in the initial training phase.

In the case in which the calculation algorithms A1, A2 are parametric algorithms too, the initial phase comprises firstly a calibration of the parameters of the single algorithm (A1/A2), to obtain the best starting reliability; such initial calibration, which may comprise also a fine tuning, depends on the particular single algorithm (per se known) and therefore it is per se known.

Then, the initial phase provides for the use of the single calculation algorithm, once it is "tuned", for the comparison between acquired coding and registered coding of each of a plurality of test users, the identity of which is known beforehand, so as to characterize the calculation algorithm, i.e., determine the False Error Ratio (in particular, False Acceptance Ratio FAR) quality coefficients thereof.

Finally, the initial phase provides for defining the weight parameters depending on the quality coefficients of each algorithm; the preferred adopted criterion is that the weight parameter is higher the higher is the quality coefficient of the calculation algorithm, or the lower is the respective FAR parameter. It should be noted that the determination of the weights is not deterministic, but is performed on the basis of supervised training techniques, taking into account the overall result produced by the meta-algorithm.

It should be noticed that the proposed method benefits from ample margins of flexibility and degrees of freedom, which may be adapted to diverse specific projects.

The number of the calculation algorithms that are employed may vary, in different embodiments of the invention.

Also the type of usable algorithms may vary, and per se known algorithms may be selected in the most suitable manner and fitted in the method of the invention.

Typically, both the trained meta-algorithm M-A and the matching level calculation algorithms A1, A2 belong to a set comprising the following algorithms or families of algorithms: "Support Vector Machines", "Restricted Boltzmann Machines", "pattern mining" algorithms, Bayesian algorithms, Markov models, neural networks, "boosting" techniques, evolutive algorithms, algorithms using Locally Weighted Linear Regression, "collaborative filtering" algorithms, algorithms using space dimension reduction techniques.

Preferably, the trained meta-algorithm is of the "Support Vector Machine" or "Restricted Boltzmann Machine" type.

Preferably, the two or more matching level calculation algorithms are different from one another, each being one of the algorithms of a set comprising: "pattern mining" algorithms, Bayesian algorithms, Markov models, neural networks, "boosting" techniques, evolutive algorithms, algorithms using Locally Weighted Linear Regression, "collaborative filtering" algorithms, algorithms using space dimension reduction techniques (for example, "Principal/Independent Components Analysis", "Singular Value Decomposition").

In the particular case where the calculation algorithms A1, A2 are analytic, they may be for example (and without limitation): algorithms based on geometric parameters and "scoring" functions; algorithms based on representation by means of equations of the surface of the hand and analytical detection of characteristic points on the surface of the hand; algorithms of the Scale Invariant Feature Transformation SITF type; algorithms based on Gabor's filters.

According to a further implementation example, the registration and recognition method of the invention also comprises the step of further training the meta-algorithm M-A, while the meta-algorithm itself is employed during one or more recognition events. Such further training is performed based on comparison results obtained during the one or more recognition events, and it involves an adjustment of the already mentioned parameters or weight parameters or coefficients associated to the correspondence level calculation algorithms.

In a particular implementation example, the further training of the meta-algorithm M-A is performed in a non-supervised manner applying feedback, i.e., taking into account the results obtained by the different calculation algorithms A1, A2, and increasing the weight of the most reliable algorithm for the formation of the meta-algorithm's opinion.

Therefore, the further training step is a step of continuous revision of the way in which the algorithms are combined (revision of the set of the weight parameters or set of the coefficients), which regulates the responses of the meta-algorithm, while the meta-algorithm M-A is used during the recognition service, in order to optimize the accuracy and minimize the "False Acceptance" error of the same meta-algorithm.

It shall be noticed that the use of a continuous "in field" training, during real recognition events, concurs to further and continuously improve the recognition reliability. This is coherent with the general logic of exploiting information as it is acquired to refine the method more and more, in line with the typical concepts of the trained algorithms, hence based on a learning.

The aforementioned training and related non-supervised learning of the meta-algorithm, during the use thereof, will now be considered in more detail.

A first non-supervised learning mode consists in monitoring the cases where a recognition threshold, pre-set for the decision (for example, above 95% or above 99%) is not reached. In such a case, aiming to recognize the user in any case, historic images that seem to be the most similar are considered, among the available ones (acquired not in the registration step, but during previous recognition events of users candidate for the recognition), to possibly overcome the recognition threshold.

This constitutes a kind of "assistance" to the formation of the opinion by the meta-algorithm.

In such cases, if a recognition is finally reached, the results provided by each calculation algorithm A1, A2 can be advantageously considered, and hence further information is available, to assess the reliability of each algorithm. Such further information may be partly different, and thus correct and refine the information available at the moment of the first supervised training.

This may lead to vary the weight parameters, of course in such a way to favour the algorithms which turn out to be, in relative terms, more reliable than expected.

The updating of the weight parameters may be carried out with a variable frequency, for example, at preset time intervals having a different duration.

The updating intervals are calculated by means of an exponential dampening formula that allows determining, during the calibration of the model, the alpha time lag parameter A further possible mode of assessing the reliability of the single algorithms (in view of a continuous, evolutionary refining of the weight parameters) is to carry out a comparison between the recognition, or non-recognition, probability of each "local" algorithm A1, A2, in those cases where the meta-algorithm M-A has reached a recognition.

Typically, in a preferred implementation example, an assessment criterion of the single local algorithms provides for the minimization of the False Acceptances (FAR). As already noticed several times, the registration and recognition method of the present invention is typically associated to an operative service, and acts in a different manner depending on requirements set by the operative service itself.

According to an embodiment of the method, it further comprises the steps of pre-defining one or more operative parameters associated to respective operations available for the operative service; then, requesting one of such operations, by the user of the service, before the recognition is completed; then, using the operative parameters associated to the operation requested by the user, both in the recognition phase, and for delivering the operative service to the user.

In fact, for each service, a set of operative parameters is defined, for example for managing the time schedules of the requested operative service (for example, to carry out a deferred execution), or as quality thresholds to manage the trade-off between velocity and accuracy in the recognition service, each threshold being related to a type of operation that the user may request.

In accordance with an embodiment of the method, the step of recognizing or refusing recognition of the user comprises verifying whether and when the matching level obtained between a recognition identification code and one of the identification codes of the comparison set is above a matching threshold.

According to a particular implementation example, a plurality of recognition thresholds is defined, each being related to a respective operation available for the operative service. In such a case, the method further comprises the steps of requesting one of the possible operations, by the user of the service, before the recognition is completed; then, automatically selecting the matching threshold related to the operation requested by the user; finally, carrying out the step of recognizing the user by using such selected threshold as the matching threshold.

The determination of the matching threshold, i.e., the recognition probability level beyond which the recognition is determined, is an important degree of freedom in view of minimizing the "False Acceptance", even at the expense of slightly worsening the "False Rejection". In fact, it should be noticed that the setting of the recognition threshold is an important step: first of all, the threshold has to be sufficiently high to allow a minimization of the "False Acceptance" occurrence (to really minimal values, considered the type of application), but, on the other hand, it must allow a sufficiently quick processing.

Of course, the higher the threshold is, the higher is the recognition requisite, and the lower is the FAR (False Acceptance Ratio"), but to the expenses of the FRR (False Rejection Ratio") parameter. To the purpose of looking for an optimal trade-off, the definition of an unchangeable threshold is a disadvantageous obstacle and rigidity factor.

Therefore, according to an embodiment of the invention, that can be implemented also independently from the other embodiments described above, the method provides for a controllable setting of the recognition threshold, as a function of peculiar parameters of the specific operation associated to a given recognition event. In particular, the threshold setting may be controlled automatically depending on "business" parameters (e.g., requested money amount). In fact, while for certain not very critical operations (for example, transactions involving a low money amount) a slightly higher FAR risk may be accepted, to obtain the benefit of a lower FRR (which concurs to avoid annoying the user, as would happen in the case of an excessively high FRR).

On the contrary, for more critical operations, such as for example, transactions involving a high money amount, the risk, hence the FAR, has to be minimized, also paying the price of a higher FRR.

In brief, the matching (i.e., recognition) threshold, can be so set as to be as high as critical the consequences of a possible "False Acceptance" are.

Since the recognition threshold defines the maximum error that is considered as acceptable (in terms of FAR, for example), it can be set to any level, depending on the needs as above described.

In accordance with a further implementation option of the method, the step of preparing a set of comparison identification codes further comprises the step of carrying out processing operations on a set of identification codes stored for the same registered user, available upon the recognition.

According to a particular implementation example, the method comprises the further steps of providing recognition identification codes, stored at different recognition events, to a further trained algorithm, together with the corresponding registration identification code of the recognized user; then, obtaining a new registration identification code for the user, by the further trained algorithm, based on the registered registration identification code for the user and the stored recognition identification codes; then, registering the new registration identification code as the user registration identification code, to take into account an evolution of the individual biometric datum of the same user, or to improve the correspondence between the biometric datum and its representation in an identification code.

Such solution offers a twofold advantage: it allows a progressive improvement in terms of recognition reliability, and it further allows an adaptation to possible organic variations upon time (due to the growth or ageing processes, or possibly to trauma).

The above-mentioned characteristic involves again the use of a trained algorithm, more specifically a further trained algorithm. To this aim, trained algorithms such as those mentioned above for the comparison step can be used.

In accordance with an implementation example, in the case where an image of the hand as the biometric datum is acquired, the step of coding the registration or recognition image comprises geometric transformation and/or filtering operations of the acquired image, carried out based on an analysis of the image contents. In fact, the recognition reliability may depend significantly from the correspondence between the positioning of the hand upon the registration event and the positioning of the hand upon the recognition event. In other terms, the spatial coordinates of the "registration reference system" have to be ideally equal to the spatial coordinates of the "acquisition reference system". An even slight positioning offset may be one of the main reasons for a recognition error.

Thus, the step of coding the image may comprise the steps of defining a reference spatial coordinate system; then, detecting an acquisition spatial coordinate system, depending on the positioning of the hand in a specific registration and/or recognition event; then, identifying a transformation of coordinates necessary to pass from the reference spatial coordinate system to the acquisition spatial coordinate system; finally, operating rotation-translation matrix processing operations on the acquired image, to obtain an equivalent acquired image, referred to the reference spatial coordinate system.

In such a manner, for each acquisition event, the differences between the optimum/ideal location of the hand and the actual positioning (optionally, also inclined) are recognized.

According to a particular implementation example, the reference system is the coordinate system relative to which the registration occurred, and thus the image processing consists in representing the image acquired during the recognition events relative to the same reference system of the registration event.

In another implementation example, the method operates auxiliary image processing operations, to obviate non-uniformities of another type between the registration and the recognition moments, for example in terms of a different brightness.

The method according to the invention, described above, may be employed not only for the recognition, but also, possibly, to perform propaedeutic or preparatory functions relative to a service delivery.

To this aim, in a particular embodiment, the method comprises, after the step of recognizing or non-recognizing the user, the further step of providing to a service delivery apparatus an indication of recognition or non-recognition of the user; furthermore, only if the user has been recognized as one of the registered users, the method comprises providing to the service delivery apparatus an indication of the identity of the recognized user.

A method of delivering a service is now described, encompassed in the invention. Such method of delivering provides that the service is delivered only after an indication of user recognition.

Furthermore, the delivery mode of the service depends on an indication of the identity of the recognized user, wherein the user recognition is carried out through a method of registration and recognition according to what has been illustrated above.

According to preferred embodiments of the invention, the above-mentioned method of delivering a service relates to the delivery of a POS service or an ATM service.

In such context, the method according to the invention can be used within the general framework of banking procedures, as a solution replacing the recognition by means of a PIN. In fact, such method permits the use of POS or ATM services even without the use of credit cards and/or without entering code numbers such as PINs or passwords.

This also involves that the procedures downstream of the recognition, for example relating to operations involving a money transfer, remain those standard procedures already used in the banking context. This aspect is a clear advantage of the proposed method, and makes it practically applicable.

For the use of certain services, the registration phase may be associated to an initial certification of the identity of the individual who is registering, of the type of those commonly in use at a bank branch office. Consequently, in this case, the registration phase typically occurs under the direct control of the back staff, for example, at the bank office.

Alternatively, different registration modes are possible, for example, based on a recognition of credit card, which modes are possible also not in an office, but at specialized points (for example, of airports).

With reference to FIG. 1, a system 1 for the quick recognition of a user of a service, by means of identification codes derivable from biometric data, is now described. Such system 1 comprises at least one recognition terminal 10, storing means 30, and a recognition apparatus (server) 20.

Each of the recognition terminals 10 comprises biometric data acquisition means 11, configured to acquire at least one user biometric datum, related to a configuration of blood vessels of the user.

Each of the recognition terminals 10 further comprises first terminal processing means 12, operatively connected to the biometric data acquisition means 11, to receive the at least one acquired biometric datum, and configured to encode the at least one acquired biometric datum into a recognition identification code of the user, at a recognition event of the user.

The storing means 30 are configured to store a plurality of registered registration identification codes The recognition apparatus 20 is operatively connected to the recognition terminal 10, to receive the recognition identification code generated by the terminal, and it is further operatively connected to the storing means 30 to access the registered registration identification codes.

The recognition apparatus 20 comprises recognition processing means 21, configured to perform at least the following operations: preparing, based on the registered registration identification codes, a comparison set, comprising a plurality of comparison identification codes; then, comparing the recognition identification code with each code of the plurality of comparison identification codes; then, estimating, for each comparison, a respective matching level, by means of a processing carried out by applying at least one trained algorithm; finally, recognizing or refusing recognition of the user to be recognized based on the estimated matching levels.

According to an implementation example, the recognition processing means 21 are configured to perform the overall algorithm related to the processing based on by logically simultaneous execution of several sequential algorithmic parts.

According to another implementation example, complementary or alternative to the previous one, the recognition processing means 21 are made by different calculation units, configured to operate concurrently in a context of distributed calculation (in which the overall algorithm is a distributed algorithm).

In accordance with a particular embodiment, the system 1 further comprises at least one registration terminal 15.

The registration terminal 15, in turn, comprises further biometric data acquisition means 16, configured to acquire at least one biometric datum related to a configuration of blood vessels of the user; and further comprises second terminal processing means 17, operatively connected to the further biometric data acquisition means 16, to receive the at least one acquired biometric datum. Such second processing means 17 are configured to encode the at least one acquired biometric datum into a registration identification code of the user, at a registration event of the user.

In such a case, the storing means 30 are further operatively connected to the registration terminal 15, to receive the registration identification code generated thereby, upon the registration event.

According to a implementation example, the registration terminal 15 and the recognition terminal 10 substantially have the same structure and the same functions.

According to a further implementation example, the registration terminal 15, configured to perform registration events, and the recognition terminal 10, configured to perform recognition events, are comprised in a single acquisition and encoding device, comprising acquisition and encoding processing means configured to operate as first terminal processing means 12 and as second terminal processing means 17.

In accordance with an embodiment of the recognition system, the recognition apparatus 20 is a server 20, located for example at an information center of the entity (e.g., bank) delivering the service, and remotely connected to the recognition terminal 10 or to the registration terminal 15 or to the acquisition and encoding device by means a communication network 50.

With reference to the aforementioned operative connections between the components of the system, it should be noticed that the operative connection between the recognition terminal 10 and the recognition server 20 can be implemented by means of any per se known telecommunications network 50 (preferably, a telecommunication network of the service provider entity, for example, a VPN of a bank).

Similarly, the operative connection between the registration terminal 15 and the recognition server 20 can be implemented by the communication network 50 or another similar telecommunications network.

The operative connection 51 between the recognition server 20 and the storing means 30 can be implemented by a telecommunications network. Preferably, the storing means 30 are co-located with the recognition server 20 in the information center of the bank, and the telecommunications network which connects them is a local network (LAN) 51 present in such a center.

In order to support the above connections, the system components (recognition terminal 10, registration terminal 15, recognition server 20, and storing means 30, if not comprised in the server 20) are provided with respective communication interfaces, per se known, to the telecommunication network(s).

According to a further particular embodiment, not illustrated in FIG. 1 the recognition system further comprises a signaling device, operatively connected to the recognition apparatus to receive an indication of recognition or non-recognition, and configured to signal such indication of recognition or non-recognition.

In a particular implementation example, the recognition signaling device is comprised in the above-mentioned acquisition and encoding device.

In accordance with an embodiment of the system, the biometric data acquisition means 11 comprise means for acquiring an image of the user's hand in the infra-red and near infra-red spectrum band, comprising at least one infra-red sensor device (in particular, operating in the infra-red and near infra-red spectrum band) configured to detect the presence of oxygen in zones corresponding to the passage of blood vessels in the hand, so as to obtain a corresponding representation of a geometry of the blood vessels of the hand. The infra-red sensor is capable of generating a digital representation of the acquired image, and the relative geometry, and of providing in output such a digital representation to the first processing means 12, to be processed as already described above. In an implementation example, the output provided by the infra-red sensor is a digital image, in the form of a bidimensional or multidimensional vector of bytes, each of which being indexed to indicate a spatial pixel, and containing a value of shade of gray of the pixel (a value ranging for example in an interval 0-255).

The above-mentioned means for acquiring the image of the hand are per se known (for example, with reference to the prior art, mentioned above in the corresponding section).

The above-mentioned first and second terminal processing means 12, 17, and the recognition processing means 21, are implemented by processors or information machines or computers, per se known.

The storing means 30 are implemented for example by means of computers or workstations provided with memories, per se known. In different embodiments of the system, they may comprise one or more storing supports for the registered identification codes. In the case of multiple storing supports, they may be centralized or distributed.

According to different implementation examples, the storing means are incorporated in the server 20, or co-located in the same information center in which the server 20 is located, or not co-located and accessible remotely.

In accordance with an embodiment, the storing means 30 comprise a database for registration of the registered identification codes.

The recognition system 1 according to the present invention, in all the embodiments described above, is configured to perform a method of registration and recognition according to any of the embodiments of the method illustrated above.

Particularly, the above-mentioned first and second terminal processing means 12, 17, and the recognition processing means 21 are configured to perform a method of registration and recognition according to any of the embodiments of the method illustrated above.

A POS (Point Of Sale) system, encompassed in the invention, for providing POS (Point Of Sale) services conditional to the recognition of a registered user, is now described The POS system 100 comprises a POS device 80, per se known, comprising POS processing means 81 configured to deliver a POS service, and further a system 1 for the quick recognition of a user according to the embodiments already described above.

In the recognition system comprised in the POS system, the recognition processing means 21 are further configured to send to the recognition terminal 10 an indication of recognition or non-recognition of the user.

The recognition terminal 10 is co-located with and operatively connected to the POS device 80 to transmit to the processing means POS 81 of the POS device 80 such an indication of recognition or non-recognition.

Furthermore, the POS processing means 81 are configured to deliver the service only if they have received the above-mentioned indication of recognition.

An ATM (Automatic Teller Machine) system, encompassed in the invention, to provide ATM (Automatic Teller Machine) services conditional to the recognition of a registered user, is now described. The term ATM is meant to indicate also the synonym term "cash dispenser".

The ATM system 200 comprises an ATM device 90, per se known, comprising ATM processing means 91 configured to deliver an ATM service, and furthermore a system 1 for the quick recognition of a user according to the embodiments already described above.

In the recognition system 1 comprised in the ATM system, the recognition processing means 21 are further configured to send to the recognition terminal 10 an indication of recognition or non-recognition of the user.

The recognition terminal 10 is co-located with and operatively connected to the ATM device 90 to transmit to the POS processing means 91 of the ATM device 90 such an indication of recognition or non-recognition.

Furthermore, the ATM processing means 91 are configured to deliver the service only if they have received the above-mentioned indication of recognition.

Figure 2:
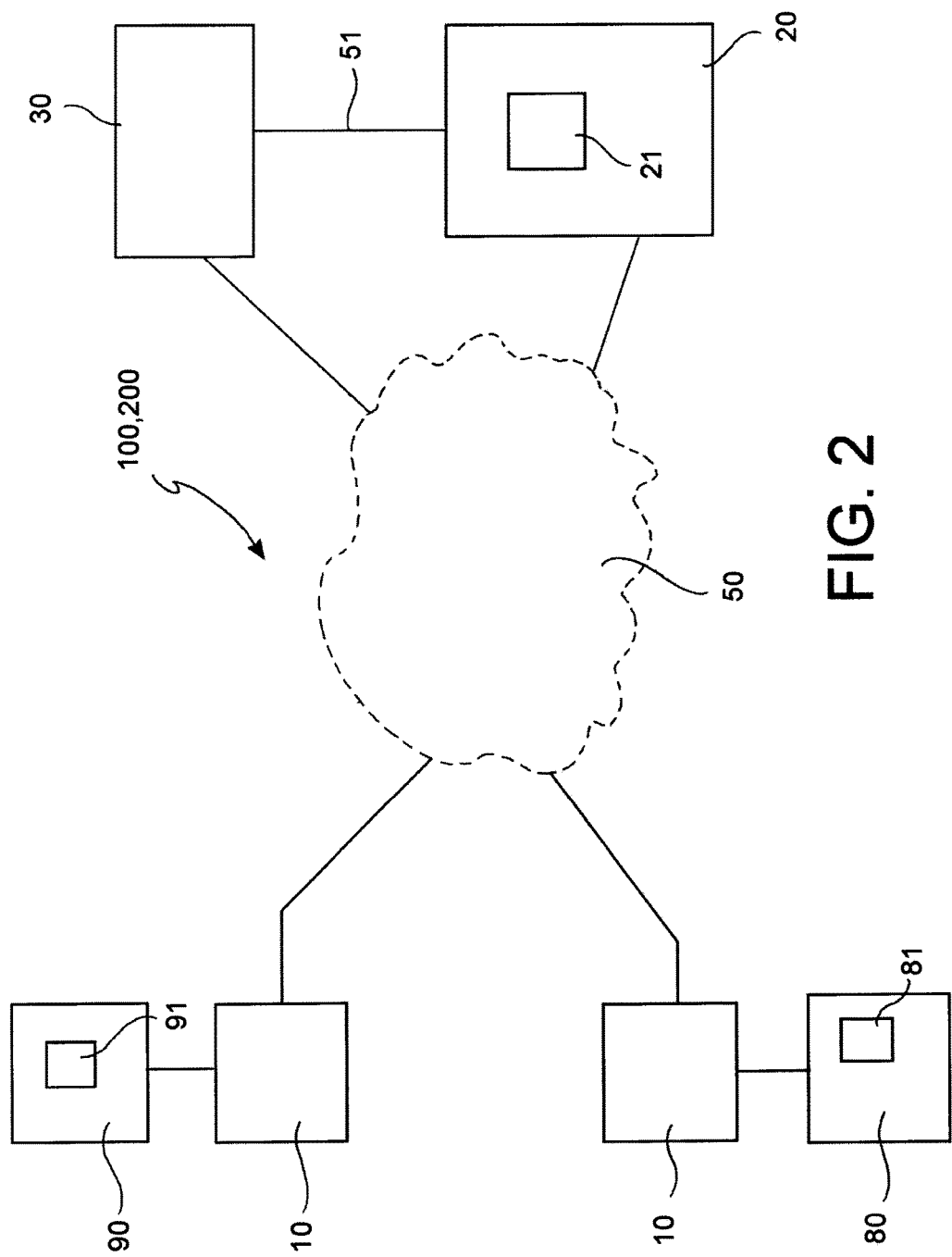
FIG. 2 illustrates a simplified functional diagram of systems for providing POS services and for providing ATM services, encompassed in the invention, which use the system of FIG. 1.

In FIG. 2, an example is illustrated, comprising both a POS system 100 (comprising a POS device 80 located for example at a shop, client of a bank) and an ATM/cash dispenser system 200 (comprising an ATM device 90 located for example at an agency or a branch of the bank), which are connected to a same recognition system (the one of the above-mentioned bank).

It shall be apparent that the invention also comprises the cases where the two systems (the POS system 100 and the ATM system 200) are mutually independent, and are connected to two different recognition systems (each according to the invention).

As it may be noticed, the object of the present invention is achieved by the method and by the systems and methods described above.

In fact, based on what has been set forth above, it is apparent that the method according to the invention is capable, based on an easy and quick procedure of biometric data acquisition, of performing a quick and reliable recognition of a user of a service among many registered users, by virtue of its own characteristics.

In particular, the encoding procedure of the biometric datum allows to decouple the biometric datum, per se, from the identification code derived therefrom (while maintaining of course a bi-unique relation). This allows, on one hand, the acquisition of a significant biometric datum by means of a "user-friendly" procedure and, on the other hand, to generate an identification code that is optimized from the point of view of the storage (it requires a few memory resources) and processing. In particular, the identification code is optimized with respect to the possibility of carrying out meaningful and quick comparisons between acquired codes and registered codes, in the context of a registration event.

In addition, the characteristics related to the classification and grouping of the registered codes, and the search modes within the set of the registered codes, further significantly improve the performance of the method in terms of recognition speed. In fact, they offer a twofold advantage: on one hand, they optimize surfing in the database containing the registered identification codes, allowing to rapidly converge to a set of codes that for some reasons has a higher probability to contain the code of the "right" user; on the other hand, they allow creating drastically reduced sets of consultation, for each terminal, dynamically updated based on the user position. Such advantages, in different embodiments of the method, may be achieved in a combined or separated manner.

Therefore, the performance of the method, in terms of velocity and reliability, that can be obtained by virtue of the above-mentioned characteristics, makes it applicable to a recognition of a user among hundreds of thousands, or even millions, with a recognition reliability level acceptable also for POS and/or ATM/cash dispenser services.

Furthermore, the optional use of at least one trained algorithm allows considerably fastening the above-mentioned comparisons, while keeping a very high recognition reliability, as required by the services at issue. In fact, the use of trained algorithms (instead of merely analytical, untrained algorithms) allows a scalability in applying the method, to a very large base of registered users, and it ensures with the due care the correctness of the method operation.

Similarly, the possibility to dynamically adjust the recognition thresholds as a function of the type of operation required by the user, in the context of a given service, improve the method flexibility, so as to optimize it for different types of operations and services.

Again, the possibility to dynamically refine the registered identification code of a given user, exploiting different and successive recognition events also to improve the registered datum, improves the recognition reliability that can be obtained by the method.

Similar considerations apply with reference to the method for delivering services, the recognition system, the POS system, and the ATM system, encompassed in the invention.

To the embodiments of the method of registration and recognition, of the method for delivering services, of the system for the recognition of a user of a service, and of ATM/POS service delivery apparatuses, according to the invention, described above, those of ordinary skill in the art, in order to meet contingent needs, will be able to make modifications, adaptations, and replacements of elements with functionally equivalent other ones, also together with the prior art, also creating hybrid implementations, without departing from the scope of the following claims. Each of the characteristics described as belonging to a possible embodiment may be implemented independently from the other embodiments described.

It shall be further noticed that the term "comprising" does not exclude other elements or steps, the term "a/an" or "one" does not exclude a plurality. Furthermore, the Figures are not necessarily in scale; on the contrary, importance is generally given to the illustration of the principles of the present invention.

The invention claimed is:

1. A method of registration and quick recognition of a user of a service, through identification codes derivable from biometric data, comprising the steps of:
    registering a user, through a respective registration event, wherein each registration event comprises:
        acquiring from the user to be registered at least one biometric datum related to a configuration of blood vessels of the user, wherein the at least one biometric datum related to a configuration of blood vessels is an image of a hand of the user to be registered or recognized;
        encoding, by a coding procedure, the at least one acquired biometric datum into a respective registration identification code of the user to be registered;
        associating said registration identification code to the user to be registered;
        registering the user as a registered user, and the associated registration identification code as the registration identification code of the registered user;
    recognizing a registered user, among a plurality of registered users, through a respective recognition event, comprising:
        acquiring from the user to be recognized said at least one biometric datum related to a configuration of blood vessels of the user;
        encoding, by said coding procedure, the at least one acquired biometric datum into a respective recognition identification code of the user to be recognized;
        preparing, based on the registration identification codes, registered at a plurality of registration events, a comparison set comprising a plurality of comparison identification codes;
        comparing the recognition identification code with each of said plurality of comparison identification codes;
        estimating, for each of said comparisons, a respective matching level;
        recognizing or refusing recognition of the user to be recognized based on the estimated matching levels;
        wherein the step of preparing a comparison set comprises defining the comparison set starting from the overall set of all the registration identification codes of the plurality of already registered users, and using, on said overall set, classification and grouping techniques on the registration identification codes;
        wherein the recognition method is associated to an operative service and acts in a different manner according to requirements imposed by the operative service;
        wherein a plurality of recognition thresholds is defined, each of the thresholds being related to a respective operation available for the operative service;
    requesting one of said operations, by the user of the service, before the recognition is completed;
    automatically selecting a recognition threshold related to the operation required by the user; and
    carrying out the step of recognizing or refusing recognition of the user by employing said selected recognition threshold as the matching threshold.

2. The method according to claim 1, wherein the step of defining a comparison set comprises the steps of:
    classifying each registered registration identification code, based on one or more classification variables;
    grouping the registered registration identification codes into sets of comparison identification codes, based on said classification.

3. The method according to claim 2, implemented by at least one recognition terminal, having a respective known localization, wherein said one or more classification variables belong to the set comprising:
    geometrical variables deriving from transformations of non-exact identification codes into identification codes according to a mathematical grammatical scheme;
    co-dependences between identification codes and known localization of said at least one recognition terminal;
    co-dependences between localization of registered users and known localization of said at least one recognition terminal.

4. The method according to claim 3, wherein the step of preparing a comparison set comprises preparing and associating to each of the at least one recognition terminal a respective comparison set, comprising a plurality of comparison identification codes, each corresponding to a registration identification code of a respective user registered in a previous registration event;
    said plurality of comparison identification codes being selected, among the registered identification codes, for each of the at least one recognition terminal, based on a comparison between localization information of the registered user and the known localization of the recognition terminal.

5. The method according to claim 2, wherein said step of grouping further comprises the step of indexing the registered registration identification codes based on said one or more classification variables.

6. The method according to claim 1, wherein each of the steps of acquiring an image of the hand of the user to be registered or recognized comprises acquiring the image of the hand by an infra-red device, configured to detect a presence of oxygen in zones corresponding to the passage of blood vessels in the hand, so as to obtain a corresponding representation of a geometry of the blood vessels of the hand.

7. The method according to claim 1, wherein each of said comparisons between the recognition identification code and one of the comparison identification codes comprises a processing carried out applying at least one trained algorithm.

8. The method according to claim 7, wherein said at least one trained algorithm comprises a trained meta-algorithm, configured to estimate the matching level of each comparison and to determine or not the recognition of the user to be recognized, based on results generated by two or more different matching level calculation algorithms and wherein the processing for comparing the recognition identification code and one of the comparison identification codes is carried out by an overall algorithm, comprising said meta-algorithm and said calculation algorithms.

9. The method according to claim 8, said trained meta-algorithm is a parametric meta-algorithm, suitable to be represented by a parametric formula based on results of a set of matching level calculation algorithms, wherein each parameter of the parametric formula is defined based on a level of reliability of the respective calculation algorithm.

10. The method according to claim 7, wherein said processing, employing at least one trained meta-algorithm, comprises:
calculating a first matching level between two identification codes to be compared by a first matching level calculation algorithm;
calculating at least one second matching level between said two identification codes to be compared by a second matching level calculation algorithm;
combining, by the trained meta-algorithm, said calculated first matching level and said calculated second matching level, each weighted by a respective weight parameter, to estimate the matching level of each comparison, wherein each of said weight parameters is defined based on a level of reliability of the respective matching level calculation algorithm.

11. The method according to claim 9, further comprising, before being used in a registration or recognition events of a user, a step of supervised training of said meta-algorithm, comprising:
training the meta-algorithm in a supervised manner, based on a series of training comparisons between acquired identification codes and already registered identification codes belonging to users having a known identity;
determining the level of reliability of said matching level calculation algorithms, based on the results of said training comparisons;
defining the parameters or the weight parameters or the coefficients of said meta-algorithm based on the determined levels of reliability, to obtain a desired overall probability of success of the recognition determined by the meta-algorithm.

12. The method according to claim 1, further comprising the steps of:
pre-defining one or more operative parameters associated to respective operations available for the operative service;
requesting one of said operations, by the user of the service, before the recognition is completed;
using the operative parameters associated to the operation requested by the user, both for the recognition event and for delivering the operative service to the user.

13. The method according to claim 1, wherein the step of recognizing or refusing to recognize the user comprises assessing whether and when the matching level obtained between a recognition identification code and one of the identification codes of the comparison set is above a matching threshold.

14. The method according to claim 1, wherein the step of preparing a set of comparison identification codes further comprises the step of performing processing operations on a set of identification codes stored for the same registered user, at different recognition events, available upon the recognition.

15. The method according to claim 1, comprising, after the step recognizing or refusing recognition, the further steps of:
providing to a service delivering apparatus an indication of recognition or non-recognition of the user;
if the user has been recognized as one of the registered users, further providing the service delivering apparatus with an indication of the identity of the recognized user.

16. A system for the quick recognition of a user of a service, by identification codes derivable from biometric data, comprising:
a. at least one recognition terminal, comprising:
biometric data acquisition means, configured to acquire at least one biometric datum related to a configuration of blood vessels of the user, wherein the at least one biometric datum related to a configuration of blood vessels is an image of a hand of the user to be registered or recognized;
first terminal processing means, operatively connected to the biometric data acquisition means, to receive the at least one acquired biometric datum, and configured to encode the at least one acquired biometric datum into a recognition identification code of the user, at a recognition event of the user;
b. storing means, configured to store a plurality of identification registration registered codes;
c. a recognition apparatus, operatively connected to the recognition terminal, to receive the recognition identification code generated by said recognition terminal, and further operatively connected to the storing means to access the registered registration identification codes, said recognition apparatus comprising recognition processing means, configured to:
prepare, based on said registered registration identification codes, a comparison set comprising a plurality of comparison identification codes;
define said comparison set starting from the overall set of all the registration identification codes of the plurality of already registered users, and using, on said overall set, classification and grouping techniques on the registration identification codes;
compare the recognition identification code with each of said plurality of comparison identification codes;
estimate, for each of said comparisons, a respective matching level;
recognize or refuse recognition of the user to be recognized based on the estimated matching levels;
automatically select a recognition threshold among a plurality of predefined recognition thresholds, each of the recognition thresholds being related to a respective operation available for an operative service; said recognition threshold being selected based on an operation requested by the user before recognition is completed;

carrying out the step of recognizing or refusing recognition by employing said selected recognition threshold as the matching threshold.

17. The system according to claim 16, further comprising at least one registration terminal, comprising:
   further biometric data acquisition means, configured to acquire at least one biometric datum related to a configuration of blood vessels of the user;
   second terminal processing means, operatively connected to the further biometric data acquisition means, to receive the at least one acquired biometric datum, said second processing means being configured to encode the at least one acquired biometric datum into a registration identification code of the user, at a registration event of the user;
   wherein the storing means are operatively connected to the registration terminal, to receive the registration identification code generated by the registration terminal, upon the registration event.

18. A service delivery system for delivering services conditional to the recognition of a registered user, comprising:
   a service delivery device, comprising service delivery processing means configured to deliver a POS service;
   a system for the quick recognition of a user according to claim 17,
   wherein the recognition processing means are further configured to send to the recognition terminal an indication of recognition or non-recognition of the user,
   and wherein the recognition terminal is co-located with and operatively connected to the service delivery device to transmit to the service delivery processing means of the service delivery device said indication of recognition or non-recognition,
   and wherein the service delivery processing means are configured to deliver the service only if the service delivery processing means have received said indication of recognition.

19. Service delivery system according to claim 18, wherein the service delivery system is a POS system for providing POS services.

20. Service delivery system according to claim 18, wherein the service delivery system is an ATM system for providing ATM services.

* * * * *